(12) United States Patent
Beuch et al.

(10) Patent No.: US 11,989,204 B2
(45) Date of Patent: May 21, 2024

(54) DATASTORE AWARE STREAMS COMPUTING

(71) Applicant: International Business Machines Corporation, Armonk, NY (US)

(72) Inventors: Daniel Beuch, Rochester, MN (US); Michael J. Branson, Rochester, MN (US); Ryan K. Cradick, Oronoco, MN (US); Adam Thomas Stallman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 17/353,928

(22) Filed: Jun. 22, 2021

(65) Prior Publication Data

US 2022/0405301 A1    Dec. 22, 2022

(51) Int. Cl.
*G06F 16/27*     (2019.01)
*G06F 11/34*     (2006.01)

(52) U.S. Cl.
CPC .......... *G06F 16/27* (2019.01); *G06F 11/3409* (2013.01)

(58) Field of Classification Search
CPC .............................. G06F 16/27; G06F 11/3409
USPC ......................................................... 707/694
See application file for complete search history.

(56) References Cited

U.S. PATENT DOCUMENTS

| | | | |
|---|---|---|---|
| 7,490,073 B1 * | 2/2009 | Qureshi | G06N 5/048 706/56 |
| 9,465,850 B2 | 10/2016 | Haber | |
| 10,409,665 B2 | 9/2019 | Steiner et al. | |
| 10,666,574 B2 | 5/2020 | Pol et al. | |
| 10,671,671 B2 | 6/2020 | Meyer et al. | |
| 10,795,876 B2 | 10/2020 | Simitsis et al. | |
| 10,810,183 B1 | 10/2020 | Cunningham et al. | |
| 2006/0149768 A1 * | 7/2006 | McCormack | G06F 3/0482 |
| 2013/0117242 A1 * | 5/2013 | Kassner | G06F 16/258 707/693 |
| 2014/0122559 A1 * | 5/2014 | Branson | H04L 67/02 709/201 |
| 2015/0222679 A1 | 8/2015 | Bhatia | |
| 2015/0256482 A1 * | 9/2015 | Bragstad | G06F 11/3442 709/219 |
| 2015/0334148 A1 * | 11/2015 | Branson | H04L 43/16 709/219 |
| 2016/0140205 A1 | 5/2016 | Hsu et al. | |

(Continued)

OTHER PUBLICATIONS

Yang et al.; "EdgeDB: An Efficient Time-Series Database For Edge Computing", IEEE ACCESS, vol. 7, pp. 142295-142307, Sep. 26, 2019.

(Continued)

*Primary Examiner* — Muluemebet Gurmu
(74) *Attorney, Agent, or Firm* — Eric W. Chesley (57) ABSTRACT

A stream of tuples is processed by a stream application. The stream application includes a plurality of processing elements that operate on one or more compute nodes, each processing element includes one or more stream operators. One or more databases that are capable of communicating with the stream application are monitored during the processing of the stream of tuples. A potential performance condition of a first database of the one or more databases is detected based on the monitoring. An output adjustment is performed, in response to the potential performance condition.

16 Claims, 3 Drawing Sheets

(56) References Cited

U.S. PATENT DOCUMENTS

| | | | |
|---|---|---|---|
| 2017/0091283 A1* | 3/2017 | Cao | G06F 8/41 |
| 2017/0126332 A1* | 5/2017 | Biswas | H04W 4/70 |
| 2019/0278807 A1 | 9/2019 | Chen et al. | |
| 2020/0034468 A1* | 1/2020 | Lei | G06F 16/2456 |
| 2020/0175018 A1 | 6/2020 | Kommera et al. | |
| 2020/0233755 A1* | 7/2020 | Bansal | G06F 11/1464 |
| 2020/0249990 A1* | 8/2020 | Barsness | G06F 16/2282 |
| 2020/0311074 A1 | 10/2020 | Lee et al. | |

OTHER PUBLICATIONS

Derakhshan et al.; "A New Operator For Efficient Stream-Relation . . . Data Streaming Engines", CIKM'13 22nd ACM Inter. Conf. On, pp. 793-798, Oct. 27-Nov. 1, 2013.

Lian et al.; "Efficient Similarity Join Over Multiple Stream Time Series", TKDE IEEE Transactions On, vol. 21, No. 11, pp. 1544-1558, Nov. 2009.

Liarou et al.; "Exploiting The Power Of Relational Databases For Efficient Stream Processing", EDBT'09 12th ACM International Conference On, pp. 323-334, Mar. 24-26, 2009.

Jeon et al.; "Distributed Join Processing Between Streaming And Stored Big Data Under The Micro-Batch Model", IEEE ACCESS, vol. 7, pp. 34583-34598, Mar. 13, 2019.

\* cited by examiner

DATASTORE AWARE STREAMS COMPUTING

BACKGROUND

The present disclosure relates to stream computing, and more specifically, to providing streams output to multiple datastores.

Stream computing may be utilized to provide real-time analytic processing to large quantities of data. Stream computing may be based on a set of processing elements or stream operators that output to a defined datastore.

SUMMARY

According to embodiments, disclosed are a method, system, and computer program product.

A stream of tuples is processed by a stream application. The stream application includes a plurality of processing elements that operate on one or more compute nodes, each processing element includes one or more stream operators. One or more databases that are capable of communicating with the stream application are monitored during the processing of the stream of tuples. A potential performance condition of a first database of the one or more databases is detected based on the monitoring. An output adjustment is performed, in response to the potential performance condition.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing; more particular aspects relate to providing streams output to multiple datastores. While the present disclosure is not necessarily limited to such applications, various aspects of the disclosure may be appreciated through a discussion of various examples using this context.

One of the uses of computing systems (alternatively, computer systems) is to collect available information, manipulate the collected information, and make decisions based on the manipulated information. Computer systems may operate on information through databases that allow users to determine what has happened and to make predictions for future results based on past events. These computer systems may receive information from a variety of sources and then record the information into permanent databases. After the information has been recorded in the databases, the computing systems may run algorithms on the information—sometimes generating new information and performing associated transformations on and storing of the new information—to make determinations and provide context to users.

The ability of computer systems to analyze information and provide meaning to users may be insufficient in some situations. The ability of large organizations, such as corporations and governments, to make decisions based on information analysis may be impaired by the limited scope of the information available. In addition, the analysis may be of limited value because it relies on stored structural databases that may contain out-of-date information. This may lead to decisions that are of limited value or, in some cases, inaccurate. For example, a weather forecast service may be unable to accurately predict precipitation for a given region, or a stock brokerage firm may make an incorrect decision regarding a trend in trading of shares.

The analytical shortcomings of computer systems may be compounded by other factors. First, the world may be becoming more instrumented, as previously unintelligent devices are now becoming intelligent devices. Intelligent devices may include devices that have historically been unable to provide analytical information, but with the additions of sensors can now do so (e.g., automobiles that are now able to provide diagnostic information to their owners or manufacturers, thermostats that now communicate information about daily temperature fluctuations in homes to users via webpages). Second, these shortcomings may also be compounded by an increase in communication from information sources, as previously isolated devices are now becoming interconnected (e.g., appliances within homes communicate with each other and with power utilities to utilize electricity). These new sources of information may provide volumes of not only isolated data points, but also relationships between the newly intelligent devices.

A third compounding factor is that users of computing systems may prefer continuous analysis of streams of information, while methods of data acquisition may provide only an event-based approach of analyzing pre-recorded information. For example, an analytics package may receive a finite amount of data and, later, apply analysis to the data. This approach may not work when dealing with a continuous stream of data. A fourth compounding factor is that computer systems may have deficiencies in handling not only the volume of information but also in dealing with the unstructured nature of the information; for example, sensors, cameras, and other new data sources may provide no context or format, just raw information. The analytics methods of computing systems may need to modify and rearrange this data in order to provide any kind of context for the raw information. The modifications and rearrangements may take time or resources that many computing systems may not be able to provide.

Yet another potential drawback is that computing systems may not provide scalable solutions to new users. The advent of smart and connected devices has provided new use-cases for analytics of continuous streams of information. Modern systems of large-scale data collection, however, may require significant user training and provide unintuitive interfaces. For example, a farmer may have each animal on a farm instrumented with sensors to monitor the health and location of the animals. The data from these sensors may enable the farmer to respond to ever-changing health conditions of the animals, but only if the sensor data is collected and transformed into a usable format to provide meaningful information to the farmer in real-time. The farmer may not have the resources to provide to a technical expert to construct a large-scale analytics package, and the obtained information may be left unused.

Stream-based computing (e.g., within a stream application) may provide users with a way to obtain meaning from extremely large sets of information (big-data). For example, stream computing may be used for scientific research purposes, such as weather forecasting and complex physics modeling. In another example, stream computing may be used for commercial purposes, such as real-time inventory management and stock market tracking. Stream computing may be used for medical purposes, such as analyzing complex and interconnected functions of the human body. Stream computing may be used by end users to more immediately and accurately understand and contextualize large amounts of information.

Stream computing may provide the ability to analyze information as it is captured but before it reaches a final destination (e.g., data from sensors being transmitted to a flat file, records being collected from internet queries and being stored to a database). In some embodiments, stream computing may provide users with the ability to analyze a stream of information that is too large to be captured and placed into a final destination (e.g., sensor values from thousands of sensors that will be discarded after being measured could be utilized by a stream computing application to provide detailed analysis). Stream computing may provide the bandwidth to process big-data continuously and in real-time (e.g., generating context from tens of millions of records per second with low latency from record reception to provide meaningful action in microseconds). Stream computing may provide users with the ability to utilize familiar programmatic conventions to provide context to big-data (e.g., using a structured language to retrieve, format, and conditionally select a subset of information regarding millions of records as those records are generated, using conditional language to trigger an action every few milliseconds based on traditional program statements applied every hundred microseconds).

Information flowing through a stream application may be in the form of streams. A stream may be made up of one or more tuples. A tuple may be a sequence of one or more associated attributes in a relational format. The tuples may share characteristics of a classical relational database (e.g., a single tuple may be similar to a row in a relational database and the attributes of a tuple may be similar to the columns of the row). The tuples may have non-relational database relationships to other tuples of a stream application (e.g., individual values, key-value pairs, flat files, etc.). Tuples may include values in a variety of known computer formats (e.g., integer, float, Boolean, string, etc.). Tuples may contain attributes about themselves, such as metadata. As used herein, a stream, streams, or data stream may refer to a sequence of tuples flowing through a stream application. Generally, a stream may be considered a pseudo-infinite sequence of tuples.

A stream application may suffer from one or more drawbacks in operation with other computing concepts. Specifically, the output of a stream application may be to a sink. A sink may be an output of a stream application. The sink may be in the form of a specialized processing element and/or stream operator. The sink may be a defined output, such as a flat file, datastore, database, or other relevant computer storage. The sink may suffer from one or more performance issues. The performance issues may include an increased latency, or dwindling throughput of the sink.

The performance issues of a sink may affect operation of the stream application. For example, a first stream application may output to a single database, and due to issues with the database, the first stream application may lose performance. Continuing the example, though the first stream application may be able to ingest and operate on tuples regardless of the amount input, output to the single database may cause a bottleneck as only so many records can be added to the single database. Further continuing the example, the first stream application may slow in operation due to the bottleneck. Another consequence of the reduced sink performance may include reduced accuracy of the stream application. For example, a second stream application may process data in real-time for an analytics application and output only a subset of tuples to a single database. Continuing the example, if the single database slows the stream application, some of the analysis may be delayed or not processed at all, reducing the value of data as it is no longer in real time. In other instances, one or more tuples may be dropped because a portion of the stream application is delayed by waiting on a sink (e.g., one or more compute nodes may not process certain tuples while waiting on a sink to receive the output of the stream application).

The sink issues may be related to the data output of the stream application. For example, a stream application may overwhelm the original output to a sink. The sink issues may be unrelated to the stream application. For example, other applications may be using the database and the use by the other applications may cause the performance degradation.

The sink issues may be related to the type of data stored in a particular sink. For example, a particular datastore may have certain records stored that share attributes or are a part of a particular dataset, such as records related to a particular party. Tuples of a given stream application may ultimately be turned into additional records of the dataset. Further, the datastore may be a load-balanced database having many individual databases; outside of the stream application a load-balancer may route output to another database of the datastore though the records in the output are related to a first database. This operation of the datastore may reduce performance of applications that are attempting to access the data after operation of the stream application.

The performance issues related to sinks may be compounded by the nature of stream applications. Specifically, the stream application may deploy an instance of the configuration to a set of hardware compute nodes. The stream application may then administer the instance by adjusting the hardware to perform the stream application as it is configured, such as by load balancing the processing elements onto compute nodes, onto a portion of a given compute node, or across multiple compute nodes. As the logic in a stream application, including the definition of the sink, is compiled, processing of tuples may be fixed during runtime. To alleviate the issues with the sink, the stream application may need to be redefined, recompiled, and then redeployed. These recompilation and redeployment steps, however, may prevent the stream application from capturing data during runtime. For example, redeployment may require the stream application to be turned off and data may not be captured at this period of time.

A datastore aware stream application (DASA) may overcome issues related to stream application sinks. The DASA may be communicatively coupled to datastores capable of communicating with the stream application and receiving storage requests. The datastores may be considered one or more databases operating as a single database, a set of uncoordinated databases, a set of coordinated databases (such as controlled by a load-balancer), one or more storage nodes configured to receive and process storage requests, and the like. The DASA may operate by monitoring active operation of the datastores that are designated or assigned to operate as a sink. Specifically, the DASA may operate by measuring the operation of the output of the stream application, such as the size and rate of growth of any output queues of the sink. Further, the DASA may operate by monitoring the operation of the actual databases that are a part of the sinks.

The DASA may be configured to increase the efficiency of the storage devices and datastores/databases that run on the storage devices. Specifically, the DASA may be configured to provide the active stream application with mechanisms to perform output adjustments to datastores based on detecting potential performance conditions. The output adjustments may include control over which databases are to be used for operation, such as output of the stream application. Further, the DASA may be configured to assign additional computing resources, such as memory, processor, and input/output ("I/O") resources of any hardware computers that host the datastores.

The operations of the DASA may allow a stream application to react to unforeseen spikes in sink activity to avoid slowdowns in individual operations. For example, the DASA may operate a stream application that is initially configured with access and usage of three databases that make up a datastore. In the event that response times for the three databases are increasing, causing additional latency issues, the DASA can assign additional databases for output of tuples. Later, if the response time reduces for all of the databases, the stream application can deallocate or unassign some databases for output of tuples.

In some embodiments, the DASA may facilitate a stream application to detect a potential performance issue before the potential issue becomes an actual performance issue. In detail, a stream application may operate by detecting a slight reduction in database performance (e.g., a three percent reduction in response time, a ten percent reduction in throughput). The slight reduction in database performance may not have an adverse effect on the stream application. For example, the stream application may be configured to perform tuple processing at a rate between thirteen hundred and fourteen hundred tuples per second. Before the slight reduction in database performance, the stream application may be operating at a rate of thirteen hundred and eighty-five tuples processed per second. After the slight reduction in database performance, the stream application may be operating at a rate of thirteen hundred and sixty-seven tuples processed per second. In some embodiments, the slight reduction in database performance may have no immediate effect on stream application performance. Based on the slight reduction, the DASA may perform an output adjustment to the databases, such as allocation of additional datastore resources.

Figure 1:
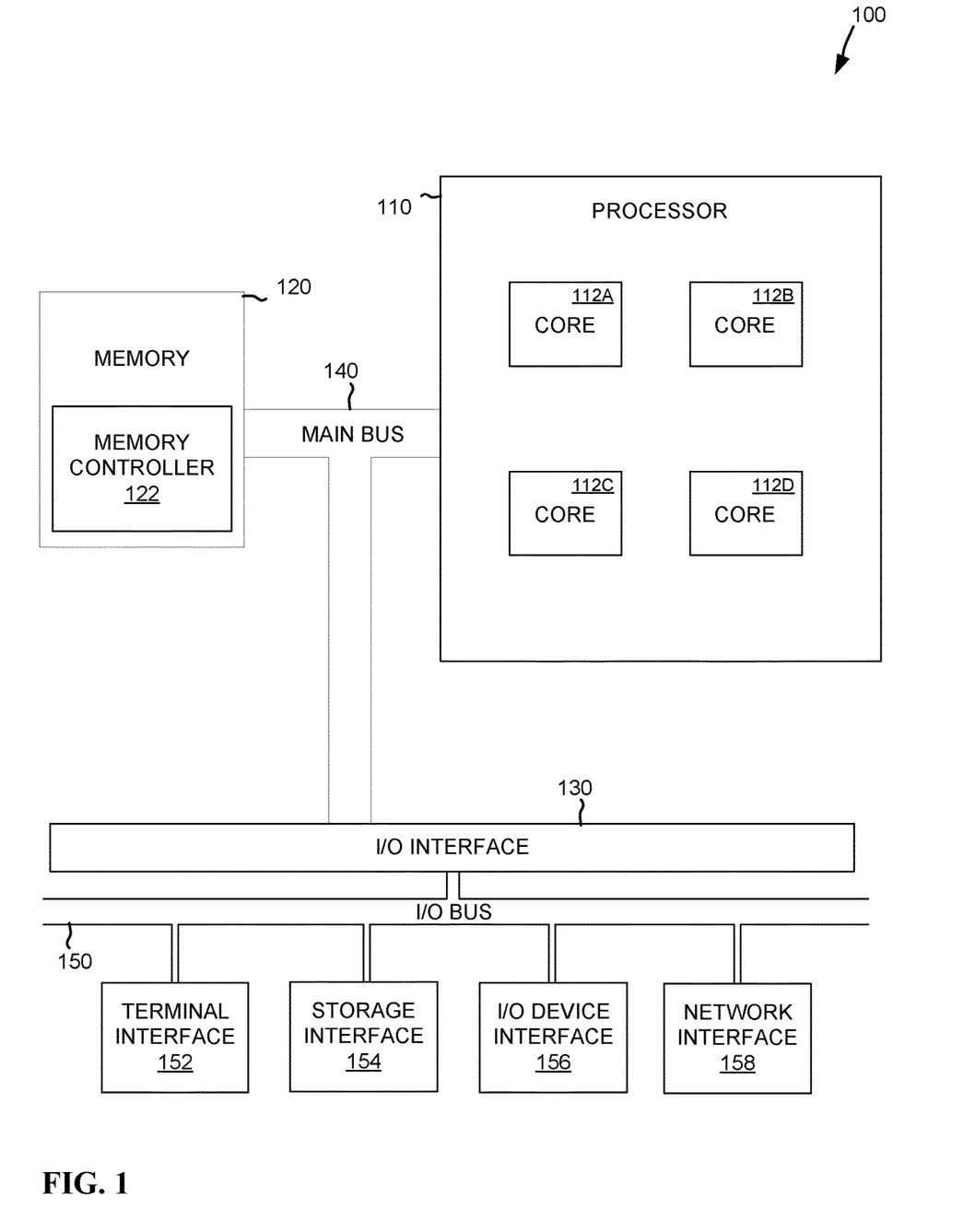
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
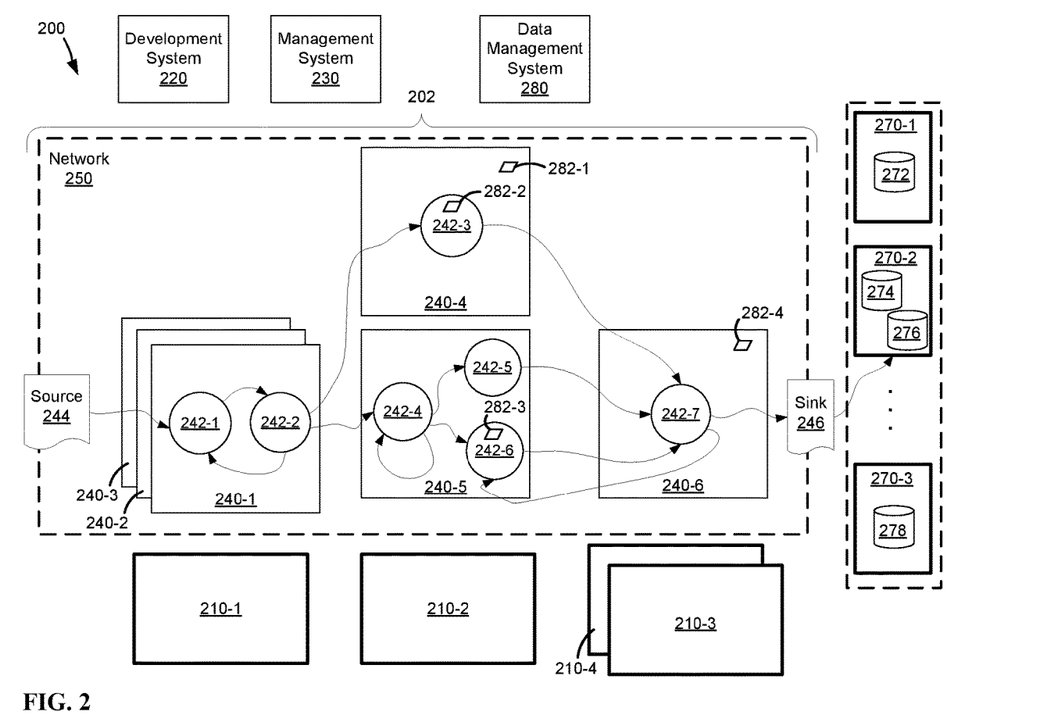
FIG. 2 depicts an example stream computing application configured to operate on a stream of tuples consistent with some embodiments of the present disclosure.

FIG. 2 depicts an example stream computing application (stream application) 200 configured to operate on a stream of tuples consistent with some embodiments of the present disclosure. The stream application 200 may be represented in the form of an operator graph 202. The operator graph 202 may visually represent to a user the flow of data through the stream application 200. The operator graph 202 may define how tuples are routed through the various components of the stream application 200 (e.g., an execution path, a precompiled logical layout of processing and resource allocation represented in FIG. 2 by the curved arrowed lines). The stream application 200 may include one or more compute nodes 210-1, 210-2, 210-3, and 210-4 (collectively, 210); a development system 220; a management system 230; one or more processing elements 240-1, 240-2, 240-3, 240-4, 240-5, and 240-6 (collectively, 240); one or more stream operators 242-1, 242-2, 242-3, 242-4, 242-5, 242-6, 242-7 (collectively, 242); and a network 250.

The stream application 200 may receive information from one or more sources 244. The input may be from outside the stream application 200, such as from a plurality of Internet of Things (IoT) devices. The stream network 250 may be a communication layer that handles connections, sends, and receives data between portions of the stream application 200. For example, stream network 250 may be a transport layer of data packets internal to the stream application 200 and configured to communicatively couple the processing elements 240.

The stream application 200 may output information to one or more sinks 246. The sinks 246 may be one or more files, datastores, databases, and/or other relevant computer storage. As depicted in FIG. 2, the stream application 200 may be configured to communicate to one or more datastores 270-1, 270-2, up to 270-3 (collectively datastores 270) as the assigned outputs of the stream application. FIG. 2 depicts three datastores 270 for example purposes, and in some embodiments more or fewer datastores 270 may be configured to communicate with, and be assigned and unassigned as sinks 246 of, the stream application 200 (e.g., one datastore, a dozen datastores). Each datastore 270 may be operating as a computing device (e.g., datastore 270-1 may operate as a server computer, datastore 270-2 may operate as a desktop computer, datastore 270-3 may operate as a cluster of computers) having memory, processing, and I/O resources. In some embodiments, computer 100 may be a computer system configured to host one or more of the datastores 270.

The stream application 200 may communicate with the datastores 270 through network 250. In some embodiments, the stream application 200 may communicate with the datastores 270 through additional networks (not depicted). For example, datastore 270-1 may be a part of network 250, and datastores 270-2 and 270-3 may be on a separate network or networks. Each of the datastores 270 may have one or more databases. For example, datastore 270-1 has a single database 272; datastore 270-2 may have two databases 274 and 276; and database 270-3 may have a single database 278. As defined by operator graph 202, the stream application 200 may initially be configured to execute by outputting data, from the stream of tuples, to datastore 270-2. For example, database 274 and database 276 may be assigned as receiving output of stream application 200.

Each of the datastores 270 may be geographically located at the same location as stream application 200, such as in a single data center or server farm, or other relevant computer installation. In some embodiments, the datastores 270 may be located at separate geographic locations. For example, datastore 270-2 and stream application 200 may be located at a first geographic location, and datastores 270 other than datastore 270-1 may be located at a second geographic location. The first geographic location and the second geographic location may be several miles, and latency may vary between the various geographic locations. For example, datastore 270-1 and stream application 200 may be located at a first geographic location, and datastores 270 other than datastore 270-1 may be located at a second geographic location. Continuing the example, a communication from the stream application 200 to datastore 270-1 may take a few milliseconds, and a communication to datastore 270-2 may take much longer (e.g., several hundred milliseconds, several seconds, a minute).

Configuration of the stream application 200, depicted by operator graph 202, is merely an example stream application. Stream applications may vary in the number of compute nodes, processing elements, or stream operators. The stream application may also vary the roles and/or responsibilities performed by any of the components or may include other components not depicted. For example, some or all of the functionality of the development system 220 may be performed by the management system 230. In another example, the functionalities of the development system 220 and the management system 230 may be performed by a singular administrative system (not depicted). The administrative system may be configured to perform these tasks without deviation from the embodiments disclosed herein. In yet another example, the functionalities of the development system 220 and the management system 230 may be performed by a plurality of services (e.g., ten or more individual software programs each configured to perform a specific function).

The compute nodes 210 may be computer systems and may each include the following components: a processor, a memory, and an input/output interface (herein I/O). Each compute node 210 may also include an operating system or a hypervisor. In some embodiments, the compute nodes 210 may perform operations for the development system 220, the management system 230, the processing elements 240, and/or the stream operators 242. The compute nodes 210 may be categorized as management hosts, application hosts, or mixed-use hosts. A management host may perform operations for the development system 220 and/or the management system 230. An application host may perform operations for the processing elements 240 and stream operators 242. A mixed-use host may perform operations of both a management host and an application host. FIG. 1 depicts a computer system 100 that may be a compute node consistent with some embodiments.

A network (not depicted) may commutatively couple each of the nodes 210 together (e.g., a local area network, the Internet, etc.). For example, node 210-1 may communicate with nodes 210-2, 210-3, and 210-4 through the network. The compute nodes 210 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 210 may communicate through a variety of protocols (e.g., the internet protocol, the transmission control protocol, the file transfer protocol, the hypertext transfer protocol, etc.). In some embodiments, the nodes 210 may share the network with other hardware, software, or services (not depicted).

The development system 220 may provide a user with the ability to create a stream application that is targeted to process specific sets of data. The development system 220 may operate on an instance of a computer system (not depicted), such as the computer system 100. The development system 220 may operate on one or more of the compute nodes 210. The development system 220 may generate one or more configuration files that describes the stream computing application 200 (e.g., the processing elements 240, the stream operators 242, the sources 244, the sinks 246, the assignment of the aforementioned compute nodes 210, etc.). The development system 220 may receive requests from a user to generate the stream application 200. The development system 220 may receive requests from a user to generate other stream applications (not depicted). The development system 220 may communicate with the management system 230 to pass along the configuration on any stream applications that the development system 220 may create.

The development system 220 may generate the configuration by considering the performance characteristics of the software components (e.g., the processing elements 240, the stream operators 242, etc.) the hardware (e.g., the compute nodes 210, the network) and the data (e.g., the sources 244, the format of the tuples, etc.). In a first example, the development system 220 may determine that the overhead of running processing elements 240-1, 240-2, and 240-3 together on compute node 210-1 results in better performance than running them on separate compute nodes. The performance may be better because of a latency incurred by running processing elements 240-1, 240-2, and 240-3 across the network 250 between compute nodes 210-1 and 210-2. In a second example, the development system 220 may determine that the memory footprint of placing stream operators 242-3, 242-4, 242-5, and 242-6 into a single processing element 240-5 is larger than the cache of a first processor in compute node 210-2. To preserve memory space inside the cache of the first processor, the development system 220 may decide to place only the stream operators 242-4, 242-5, and 242-6 into a single processing element 240-5, despite the inter-process communication latency of having two processing elements 240-4 and 240-5.

In a third example of considering the performance characteristics, the development system 220 may identify a first operation (e.g., an operation being performed on processing element 240-6 on compute node 210-3) that requires a larger amount of resources of the stream application 200. The development system 220 may assign a larger amount of resources (e.g., operating the processing element 240-6 on compute node 210-4 in addition to compute node 210-3) to aid the performance of the first operation. The development system 220 may identify a second operation (e.g., an operation being performed on processing element 240-1) that requires a smaller amount of resources within the stream application 200. The development system 220 may further determine that the stream application 200 may operate more efficiently through an increase in parallelization (e.g., more instances of processing element 240-1). The development system 220 may create multiple instances of processing element 240-1 (e.g., processing elements 240-2 and 240-3). The development system 220 may then assign processing elements 240-1, 240-2, and 240-3 to a single resource (e.g., compute node 210-1). Lastly, the development system 220 may identify a third operation and fourth operation (e.g., operations being performed on processing elements 240-4 and 240-5) that each require low levels of resources. The development system 220 may assign a smaller amount of resources to the two different operations (e.g., having them share the resources of compute node 210-2 rather than each operation being performed on its own compute node).

The development system 220 may include a compiler (not depicted) that compiles modules (e.g., processing elements 240, stream operators 242, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 210). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The management system 230 may monitor and administer the stream application 200. The management system 230 may operate on an instance of a computer system (not depicted), such as computer system 100. The management system 230 may operate on one or more of the compute nodes 210. The management system 230 may also provide the operator graph 202 of the stream application 200. The management system 230 may host the services that make up the stream application 200 (e.g., services that monitor the health of the compute nodes 210, the performance of the processing elements 240 and stream operators 242, etc.). The management system 230 may receive requests from users (e.g., requests to authenticate and authorize users of the stream application 210, requests to view the information generated by the stream application, requests to view the operator graph 202, etc.).

The management system 230 may provide a user with the ability to create multiple instances of the stream application 200 configured by the development system 220. For example, if a second instance of the stream application 200 is required to perform the same processing, then the management system 230 may allocate a second set of compute nodes (not depicted) for performance of the second instance of the stream application. The management system 230 may also reassign the compute nodes 210 to relieve bottlenecks in the system. For example, as shown, processing elements 240-4 and 240-5 are executed by compute node 210-2. Processing element 240-6 is executed by compute nodes 210-3 and 210-4. In one situation, the stream application 200 may experience performance issues because processing elements 240-4 and 240-5 are not providing tuples to processing element 240-6 before processing element 240-6 enters an idle state. The management system 230 may detect these performance issues and may reassign resources from compute node 210-4 to execute a portion or all of processing element 240-4, thereby reducing the workload on compute node 210-2. The management system 230 may also perform operations of the operating systems of the compute nodes 210, such as the load balancing and resource allocation of the processing elements 240 and stream operators 242. By performing operations of the operating systems, the management system 230 may enable the stream application 200 to more efficiently use the available hardware resources and increase performance (e.g., by lowering the overhead of the operating systems and multiprocessing hardware of the compute nodes 210).

The processing elements 240 may perform the operations of the stream application 200. Each of the processing elements 240 may operate on one or more of the compute nodes 210. In some embodiments, a given processing element 240 may operate on a subset of a given compute node 210, such as a processor or a single core of processor of a compute node 210. In some embodiments, a given processing element 240 may correspond to an operating system process of an operating system hosted by a compute node 210. In some embodiments, a given processing element 240 may operate on multiple compute nodes 210. The processing elements 240 may be generated by the development system 220. Each of the processing elements 240 may be in the form of a binary file and additionally library files (e.g., an executable file and associated libraries, a package file containing executable code and associate resources, etc.).

Each of processing elements 240 may include configuration information from the development system 220 or the management system 230 (e.g., the resources and conventions required by the relevant compute node 210 to which it has been assigned, the identity and credentials necessary to communicate with the sources 244 or sinks 246, and the identity and credentials necessary to communicate with other processing elements, etc.). Each of the processing elements 240 may be configured by the development system 220 to run optimally upon one of the compute nodes 210. For example, processing elements 240-1, 240-2, and 240-3 may be compiled to run with optimizations recognized by an operating system running on compute node 210-1. The processing elements 240-1, 240-2, and 240-3 may also be optimized for the particular hardware of compute node 210-1 (e.g., instruction set architecture, configured resources, such as memory and processor, etc.).

Each of processing elements 240 may include one or more stream operators 242 that perform basic functions of the stream application 200. As streams of tuples flow through the processing elements 240, as directed by the operator graph 202, they pass from one stream operator to another (e.g., a first processing element may process tuples and place the processed tuples in a queue assigned to a second processing element, a first stream operator may process tuples and write the processed tuples to an area of memory designated to a second stream operator, tuples after processing may not be moved but may be updated with metadata to signify they are ready for processing by a new processing element or stream operator, etc.). Multiple stream operators 242 within the same processing element 240 may benefit from architectural efficiencies (e.g., reduced cache missed, shared variables and logic, reduced memory swapping, etc.). The processing elements 240 and the stream operators 242 may utilize inter-process communication (e.g., network sockets, shared memory, message queues, message passing, semaphores, etc.). The processing elements 240 and the stream operators 242 may utilize different inter-process communication techniques depending on the configuration of the stream application 200. For example: stream operator 242-1 may use a semaphore to communicate with stream operator 242-2; processing element 240-1 may use a message que to communicate with processing element 240-3; and processing element 240-2 may use a network socket to communicate with processing element 240-4.

The stream operators 242 may perform the basic logic and operations of the stream application 200 (e.g., processing tuples and passing processed tuples to other components of the stream application). By separating the logic that may occur within a single larger program into basic operations performed by the stream operators 242, the stream application 200 may provide greater scalability. For example, tens of compute nodes hosting hundreds of stream operators in a given stream application may enable processing of millions of tuples per second. The logic may be created by the development system 220 before runtime of the stream application 200. In some embodiments, the sources 244 and the sinks 246 may also be stream operators 242. In some embodiments, the sources 244 and the sinks 246 may link multiple stream applications together (e.g., the sources 244 could be sinks for a second stream application, and the sinks 246 could be sources for a third stream application). The stream operators 242 may be configured by the development system 220 to optimally perform the stream application 200 using the available compute nodes 210. The stream operators 242 may send and receive tuples from other stream operators. The stream operators 242 may receive tuples from the sources 244 and may send tuples to the sink 246.

The stream operators 242 may perform operations (e.g., conditional logic, iterative looping structures, type conversions, string formatting, filter statements, etc.) upon the attributes of a tuple. In some embodiments, each stream operator 242 may perform only a very simple operation and may pass the updated tuple on to another stream operator in the stream application 200—simple stream operators may be more scalable and easier to parallelize. For example, stream operator 242-2 may receive a date value to a specific precision and may round the date value to a lower precision and pass the altered date value to stream operator 242-4 that may change the altered date value from a 24-hour format to a 12-hour format. A given stream operator 242 may not change anything about a tuple. The stream operators 242 may perform operations upon a tuple by adding new attributes or removing existing attributes.

The stream operators 242 may perform operations upon a stream of tuples by routing some tuples to a first stream operator and other tuples to a second stream operator (e.g., stream operator 242-2 sends some tuples to stream operator 242-3 and other tuples to stream operator 242-4). The stream operators 242 may perform operations upon a stream of tuples by filtering some tuples (e.g., culling some tuples and passing on a subset of the stream to another stream operator). The stream operators 242 may also perform operations upon a stream of tuples by routing some of the stream to itself (e.g., stream operator 242-4 may perform a simple arithmetic operation and, as part of its operation, it may perform a logical loop and direct a subset of tuples to itself). In some embodiments, a particular tuple output by a stream operator 242 or processing element 240 may not be considered to be the same tuple as a corresponding input tuple even if the input tuple is not changed by the stream operator or the processing element.

The stream application 200 may be configured to perform one or more DASA operations. The operations of the DASA may be unrelated to the initial or predefined configuration of the stream application 200. For example, the stream application 200 may assign or unassign datastores 272 that were originally not a part of the operator graph 202. The operations may be performed by an administrative component of the stream application 200.

In detail, the stream application 200 may include a data management system ("DMS") 280. The DMS 280 may be a computational part of the stream application 200, such as a component running on one or more of the compute nodes 210. The DMS 280 may be a separate computational component from the stream application 200, such as running on a separate computer system (e.g., computer 100). The DMS 280 may operate based on instruction from a user. The DMS 280 may operate based on a predetermined routine, to monitor operation of the stream application 280. For example, the DMS 280 may be configured to monitor operation of the stream application 200, as it performs processing of tuples. The operation of the stream application 200 may include one or more predefined metrics, such as a certain tuple processing rate, a certain throughput, an output queue of the sinks 246, an input queue from the sources 244, or other relevant streams metrics.

The DMS 280 may be configured to monitor the datastores 270 and the databases 272, 274, 276, and 278. The DMS 280 may be configured to determine potential performance issues, such as increased latency, reduced throughput, or other relevant performance metrics of the datastores 270. The DMS 280 may also be configured to determine potential performance issues of other applications outside of the stream application 200. Specifically, the DMS 280 may be configured to interface with, monitor, or otherwise access the datastores 270. The DMS 280 may include one or more credentials and/or application programming interfaces ("APIs") used by software of one or more of the datastores 270 to monitor processing, memory, I/O performance. For example, certain permissions may include elevated credentials that permit the DMS 280 to monitor operation of databases, such as the rate of requests processed, the size of tables, the type of records present, and the like. The permissions and/or APIs may be unrelated to the specific resources of the databases of the datastores 270. For example, the DMS 280 may monitor the request queues of datastore 270-1 and detect any current application queries that are directed to specific records in database 272.

In some embodiments, the stream application 200 may identify a set of candidate databases for future sinks 246. In detail, the DMS 280 may operate by periodically (e.g., every two hundred milliseconds, every second, every fifteen milliseconds) to monitor the datastores 270 and databases 272, 274, 276, and 278. The monitoring may include monitoring the performance of the datastores 270-1 and 270-3 that are not configured to output as part of the sinks 246. A database, such as database 278 may be identified as a set of one or more databases that could receive data from the stream application 200. At a later time period, when an output adjustment is performed upon detecting a potential performance condition of databases 274 and 276, the DMS 280 may assign one or more of the identified candidates. In some embodiments, the set of candidate databases may be ordered or ranked based on one or more factors, such as the latency, throughput, datatype, or workloads on the databases and/or datastores 270.

Further, the DASA may be implemented in part of one or more of the components of the stream application 200 that are present in a compiled operator graph 202. For example, the stream application 200 may include data aware components ("DACs") 282-1, 282-2, 282-3, and 282-4 (collectively, DACs 282). The DACs 282 may monitor tuples and detect the particular attributes of each tuple as they pass through the stream application 200—for example, identifying a name, record id, or other value in a particular tuple. The DACs 282 may be a part of executable code inside of processing element 240 and/or stream operator 242. For example, DAC 282-1 may be code located in processing element 240-4, while DAC 282-3 may be located in stream operator 242-6. The DACs 282 may communicate with the DMS 280 to facilitate monitoring of the stream application.

The DMS 280 may perform one or more output adjustments to the datastores 270 to increase and/or sustain performance of the stream application 200. For example, based on detecting a reduction in performance of database 274, the DMS 280 may allocate or assign additional datastores 270 as part of the sinks 246. In another example, based on receiving tuple processing information from the DACs 282, such as determining a tuple processing rate of the stream application 200, the DMS 280 may unassign a particular datastore 270. In yet another example, the DMS 280 may unassign a particular datastore 270 that is underperforming in its ability to ingest data from the stream application 200. The stream application 200 may utilize a certain predefined threshold or triggering event to determine DASA operation. For example, based on a time threshold of thirty minutes after the stream application 200 begins processing tuples, the DMS 280 may perform an output adjustment to assign or unassign a particular datastore 270 as output for the sinks 246.

The DMS 280 may leverage the DACs 282 to perform DASA regarding the datastores 270 that are unrelated the stream application 200, such as other applications or workloads related to the datastores 270. For example, stream operator 242-6 may leverage DAC 282-3 to identify one or more attribute of a subset of tuples that are processed by the stream application 200. The attributes may be provided to the DMS 280 for additional processing. The DMS 280 may compare the attributes to one or more records in the preset sink 246, e.g., the records in databases 274 and 276. The DMS 280 may determine that there is a tuple relationship between the attributes and the records stored in the databases 274 and 276. The relationship may be that certain records in database 276 will be a part of a future communication with a specific application. The relationship may be that the certain records in database 276 have related values with the tuples being processed and monitored in the stream application 200. The DMS 280 may perform an output adjustment based on the relationship of the detected potential performance condition. For example, the DMS 280 may remove database 276 from a potential list of candidates to be removed or unassigned as part of sinks 246. In another example, the DMS 280 may reduce the rank of database 276 on a list of candidates to be unassigned as output, decreasing the likelihood that database 276 will be removed from sinks 246.

Figure 3:
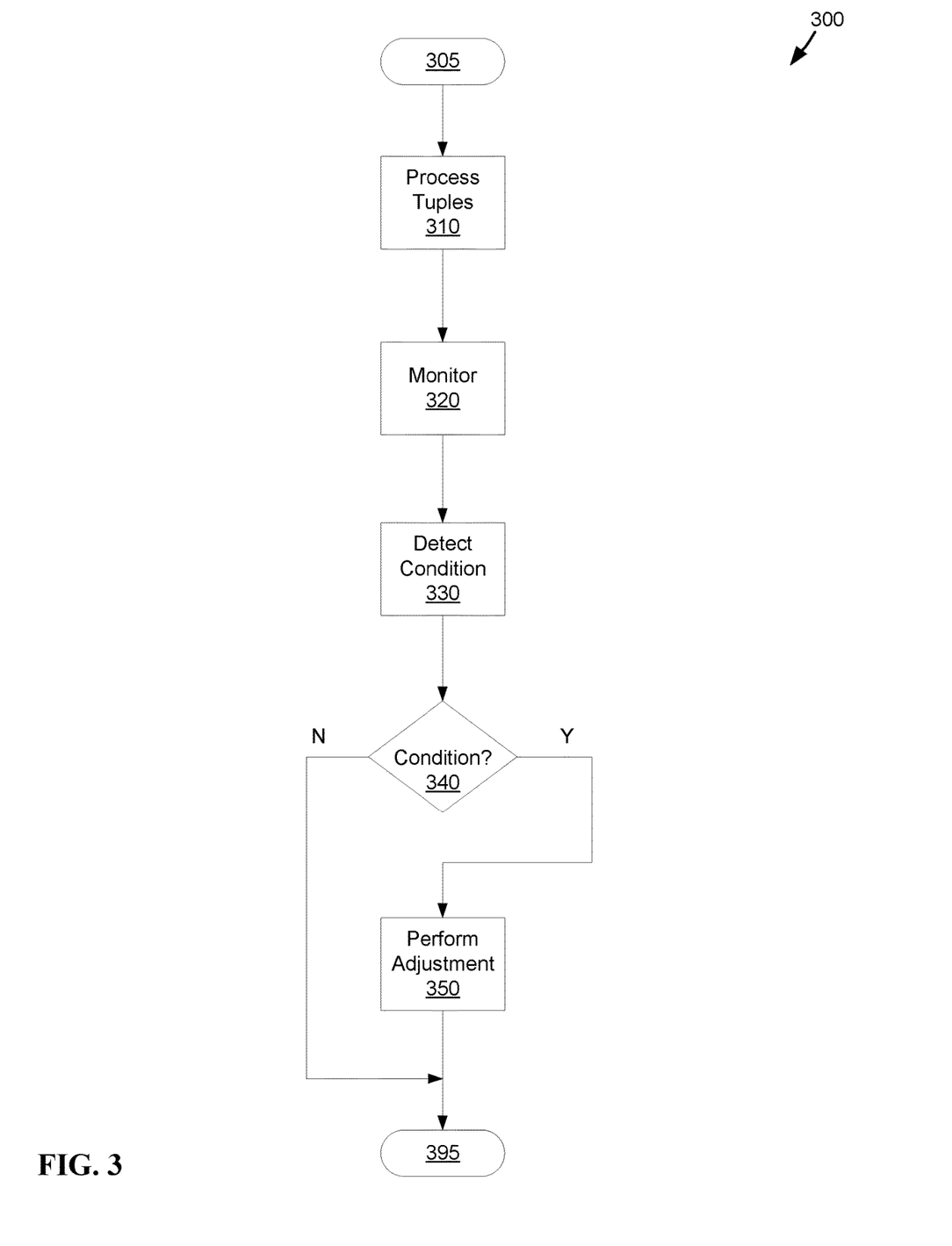
FIG. 3 depicts an example method of performing streams processing while considering operation of one or more datastores, consistent with some embodiments of the disclosure.

FIG. 3 depicts an example method 300 of performing streams processing while considering operation of one or more datastores, consistent with some embodiments of the disclosure. Method 300 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 300 may be implemented by a computer system, such as computer system 100. Method 300 may be implemented by a stream application, such as stream application 200.

Method 300 begins at 305, by a stream application processing a stream of tuples at 310. The stream of tuples may be processed by one or more stream operators and/or processing elements. For example, stream application 200, may process the depicted stream of tuples by each of the processing elements and stream operators ingesting, operating on, and creating new tuples to be processed by other processing elements and stream operators. During operation, the stream application 200 may be configured to provide as output data created by processing the tuples to one or more assigned sinks.

At 320, a datastore may be monitored during processing of the stream of tuples. The monitoring of the datastore may include monitoring of multiple datastores, including any datastores that are assigned as output of the stream application. The monitoring of the datastore may include monitoring of datastores that are not currently assigned as output of the stream application. Specifically, one or more additional databases, flat files, or other relevant computer storage may be monitored that are in communication with the stream application. The additional datastores that are monitored may be those on a common network, another network, or are otherwise capable of communication with the stream application. For example, a datastore may be in a sleep, hibernate or other relevant standby state with a wake-on network function. In response to receiving a command from the stream application, such as a ping, the standby datastore may temporarily wake and respond with a status to the stream application. In some embodiments, the stream processing may be monitored at 320. For example, one or more stream operators and/or processing elements may report various attributes about or contained in the stream of tuples that are being processed by the stream application.

At 330 a performance condition of the datastores may be detected. The performance condition may be an active performance condition, such as the current input rate, write queue, or table size of a particular database or datastore. The performance condition may be a potential performance condition, such as a predicted threshold of performance of a particular datastore. For example, a predetermined threshold or trigger may be a table size of over twenty terabytes stored in a database table. The performance condition may be that the current table size is over the predetermined threshold. The potential performance condition may be that the current table size is 90% of predetermined threshold and that the table size is increasing.

If a performance condition is detected, at 340:Y, method 300 may continue by performing an output adjustment at 350. The output adjustment may be to assign additional datastores for receiving output of the stream application. For example, the sink may be defined as a pointer or reference to an intermediary, such as an editable file that includes a list of accessible datastores. The output adjustment may be to update the sink by including additional datastores. The output adjustment may be to unassign or deallocate datastore. For example, a sink may be directed to three datastores, including a first datastore, a second datastore, and a third datastore. The output adjustment may be to intercept traffic that is directed to the third datastore and reroute the intercepted traffic to the first datastore and to the second datastore.

After the performing the output adjustment at 350, or if a performance condition is not detected at 340:N, method 300 may end at 395. Certain operations of method 300 may continue or repeat. For example, after the stream application begins processing of tuples, one or more operations, such as any of operations 320-350, may execute until the stream application stops processing tuples.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing streams of tuples, the method comprising:
    processing, by a stream application, a stream of tuples, wherein the stream application includes a plurality of processing elements that operate on one or more compute nodes, each processing element comprising one or more stream operators;
    monitoring, by the stream application during the processing of the stream of tuples, a frequency of database operations performed at one or more databases that communicate with the stream application as part of performing as an assigned sink to receive output of the stream application;
    detecting, by the stream application based on the monitoring, a potential performance condition of a first database of the one or more databases, the potential performance condition including a change in the frequency of database operations performed at the first database; and
    performing, by the stream application in response to the potential performance condition, an output adjustment.

2. The method of claim 1, wherein:
    the monitoring further includes monitoring a response time of the one or more databases; and
    the potential performance condition further includes an increase in a response time of the first database.

3. The method of claim 1, wherein the output adjustment includes assigning a second database as a sink for receiving the output of the stream application.

4. The method of claim 3, wherein the output adjustment includes assigning a third database as a sink for receiving the output of the stream application.

5. The method of claim 1, wherein the output adjustment includes unassigning the first database.

6. The method of claim 3, wherein:
    the first database is located at a first geographic region; and
    the second database is located at a second geographic region.

7. The method of claim 6, wherein the stream application is located at the first geographic region.

8. The method of claim 1, wherein the potential performance condition is a decrease in performance of the first database, and wherein the method further comprises:
    identifying a set of candidate databases for receiving the output of the stream application; and
    wherein the output adjustment includes assigning, from the set of candidate databases, a second database as a sink for receiving the output of the stream application.

9. The method of claim 1, wherein:
    the potential performance condition is a tuple relationship, and
    the detecting of the potential performance condition further comprises:

identifying one or more attributes of a subset of tuples processed by a first stream operator of the stream application; and determining, based on the subset of tuples and based on the first database, the tuple relationship.

10. The method of claim 9, wherein the tuple relationship includes a relationship between the one or more attributes and one or more record values in the first database.

11. The method of claim 9, wherein the tuple relationship includes a relationship between the one or more attributes and an application, wherein the application is related to in communication with the first database.

12. The method of claim 9, wherein the output adjustment includes unassigning a second database as a sink for receiving the output of the stream application.

13. A system for processing streams of tuples, the system comprising:

a memory, the memory containing one or more instructions; and a processor, the processor communicatively coupled to the memory, the processor, in response to reading the one or more instructions, configured to:

process, by a stream application, a stream of tuples, wherein the stream application includes a plurality of processing elements that operate on one or more compute nodes, each processing element having one or more stream operators;

monitor, by the stream application during the processing of the stream of tuples, a response time of one or more databases that communicate with the stream application as part of performing as an assigned sink to receive output of the stream application;

detect, by the stream application based on the monitoring, a potential performance condition of a first database of the one or more databases, the potential performance condition including an increase in a response time of the first database; and perform, by the stream application in response to the potential performance condition, an output adjustment.

14. The system of claim 13, wherein the monitor further includes monitoring a frequency of database operations of the one or more databases, and the potential performance condition further includes a change in the frequency of database operations at the first database.

15. A computer program product, the computer program product comprising:

one or more computer readable storage media; and program instructions collectively stored on the one or more computer readable storage media, the program instructions configured to:

process, by a stream application, a stream of tuples, wherein the stream application includes a plurality of processing elements that operate on one or more compute nodes, each processing element having one or more stream operators;

monitor, by the stream application during the processing of the stream of tuples, a frequency of database operations performed at one or more databases that communicate with the stream application as part of performing as an assigned sink to receive output of the stream application;

detect, by the stream application based on the monitoring, a potential performance condition of a first database of the one or more databases, the potential performance condition including a change in the frequency of database operations performed at the first database; and perform, by the stream application in response to the potential performance condition, an output adjustment.

16. The computer program product of claim 15, wherein:

the monitor further includes monitoring a response time of the one or more databases, and the potential performance condition further includes an increase in a response time of the first database.

* * * * *